United States Patent
Thanigasalam

(10) Patent No.: US 10,291,814 B2
(45) Date of Patent: May 14, 2019

(54) TRANSMISSION OF ENCRYPTED IMAGE DATA

(71) Applicant: INTEL CORPORATION, Santa Clara, CA (US)

(72) Inventor: Haran Thanigasalam, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 20 days.

(21) Appl. No.: 15/783,597

(22) Filed: Oct. 13, 2017

(65) Prior Publication Data

US 2018/0109696 A1    Apr. 19, 2018

Related U.S. Application Data

(60) Provisional application No. 62/408,553, filed on Oct. 14, 2016.

(51) Int. Cl.
| | | |
|---|---|---|
| *H04N 1/32* | (2006.01) | |
| *G06T 1/00* | (2006.01) | |
| *H04L 9/08* | (2006.01) | |
| *H04L 9/12* | (2006.01) | |
| *H04L 9/14* | (2006.01) | |

(52) U.S. Cl.
CPC ....... *H04N 1/32272* (2013.01); *G06T 1/0007* (2013.01); *H04L 9/0819* (2013.01); *H04L 9/0822* (2013.01); *H04L 9/12* (2013.01); *H04L 9/14* (2013.01)

(58) Field of Classification Search
CPC ................................................. H04N 1/32272
See application file for complete search history.

(56) References Cited

U.S. PATENT DOCUMENTS

| | | | |
|---|---|---|---|
| 5,990,469 A | 11/1999 | Bechtel et al. | |
| 7,885,409 B2 * | 2/2011 | Jakoubek | H04B 1/0003 380/255 |
| 9,755,818 B2 | 9/2017 | Sengoku | |
| 2001/0049788 A1 * | 12/2001 | Shur | G06T 1/0028 713/179 |
| 2003/0133448 A1 | 7/2003 | Frink et al. | |

(Continued)

FOREIGN PATENT DOCUMENTS

WO    2017062084 A1    4/2017

OTHER PUBLICATIONS

Thanigasalam, Haran, U.S. Appl. No. 15/232,881, filed Aug. 10, 2016, US Application, Drawings, and E-Ack Receipt attached 38 pages, not yet published.

*Primary Examiner* — Ted W Barnes
(74) *Attorney, Agent, or Firm* — International IP Law Group, P.L.L.C.

(57) ABSTRACT

In one example, a system for transmitting encrypted data includes a processor to select a virtual channel to be encrypted between an application processor and an image sensor during an initialization process. The processor can also transmit a virtual channel command corresponding to the selected virtual channel to the image sensor. The processor can also poll a register in the image sensor to verify the image sensor has stored an encryption key corresponding to the selected virtual channel and detect image data from the image sensor via the virtual channel, the image data encrypted with the encryption key.

22 Claims, 9 Drawing Sheets

(56) References Cited

U.S. PATENT DOCUMENTS

| | | | |
|---|---|---|---|
| 2003/0235308 A1* | 12/2003 | Boynton | H04W 76/10 380/270 |
| 2007/0110237 A1* | 5/2007 | Tehranchi | G06T 1/0035 380/201 |
| 2011/0143811 A1* | 6/2011 | Rodriguez | G06K 9/00986 455/556.1 |
| 2012/0026341 A1 | 2/2012 | Yu et al. | |
| 2014/0049653 A1* | 2/2014 | Leonard | G06T 1/0042 348/207.1 |
| 2014/0177836 A1* | 6/2014 | Wu | G09C 5/00 380/243 |
| 2014/0229644 A1* | 8/2014 | Thanigasalam | G06F 13/24 710/110 |
| 2014/0313360 A1 | 10/2014 | Lee et al. | |
| 2014/0354527 A1 | 12/2014 | Chen et al. | |
| 2016/0099920 A1* | 4/2016 | Meuleman | H04L 63/0435 713/153 |
| 2017/0104733 A1 | 4/2017 | Thanigasalam | |
| 2017/0116150 A1 | 4/2017 | Wiley | |

\* cited by examiner

400

500

TRANSMISSION OF ENCRYPTED IMAGE DATA

CROSS-REFERENCE TO RELATED APPLICATIONS

This Application claims the benefit of U.S. Provisional Patent Application Ser. No. 62/408,553, titled "Transmission of Encrypted Image Data," and filed on Oct. 14, 2016, the contents of which are incorporated by reference as though fully set forth herein.

TECHNICAL FIELD

This disclosure relates generally to transmitting image data and specifically, but not exclusively, to enabling a transmission of encrypted image data.

BACKGROUND

Computing devices are incorporating an increasing number of sensors to capture data corresponding to digital photography and imaging applications. As a result, processors in the computing devices and digital cameras can transmit various complex management and configuration commands, firmware updates, and the like, to image sensors. For example, the processor can use a dedicated bidirectional link to transfer the management commands and firmware updates to an image sensor, while receiving image data captured by the image sensor via a separate unidirectional link. Alternatively, the processor can use one bidirectional link to transfer the management commands and firmware updates to an image sensor, and receive image data captured by the image sensor.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
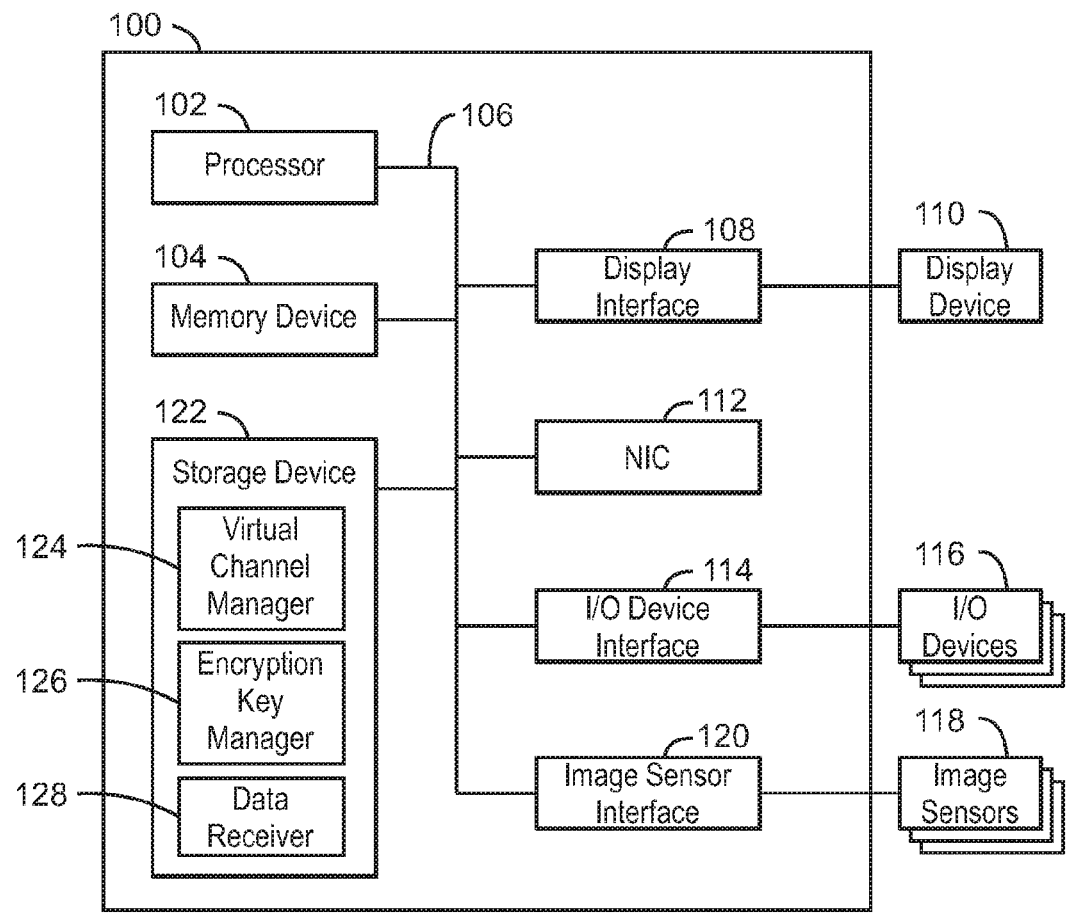
FIG. 1 illustrates a block diagram of a computing device that can transmit encrypted image data.

In some examples, processors and image sensors transmit image data using a unidirectional data link and a separate bidirectional command link for additional data such as firmware updates, camera management commands, and the like. In other examples, processors and image sensors can transmit sensor image data and camera management commands via a single bidirectional serial interface data link. In some embodiments, the techniques described herein can provide a pathway for secure transactions using virtual channel based encryption and may prevent malicious attacks that, for example, involve hijacking or spoofing camera management commands over an inter-integrated circuit (I2C) channel. Techniques described herein may enable an image sensor to transmit encrypted image data to an application processor. The image data may correspond to biometric information, retinal scan information, infrared information, digital image information, and the like.

The techniques described herein include selecting a virtual channel to be encrypted between an application processor and an image sensor during an initialization process. A virtual channel, as referred to herein, can transmit image data from an image sensor to an application processor using any suitable protocol. An application processor, as referred to herein, can include any number of processors, circuits, logic, systems on a chip (SOCs), and the like, that can generate, detect, and transmit camera management commands and capture image data from image sensors. For example, a virtual channel may transmit image data to an application processor corresponding to compressed image information, infrared information, high resolution information, low resolution information, metadata, and the like. In some embodiments, each image sensor can have any suitable number of virtual channels that transmit image data. In some examples, an image sensor can detect an encryption key from an application processor and store the encryption key locally. In some embodiments, the image sensor detects the encryption key from an infrared transmitter, or a grid-to-bit figure, or from a direct transfer by the application processor, among others. The image sensor can associate the encryption key with a virtual channel to form an encrypted virtual channel. In some examples, the application processor can map the encrypted key to a select virtual channel and the operation of the encrypted channel by initiating the image sensor to transfer a predefined test pattern using the encrypted virtual channel.

Additionally, the techniques described herein include polling a register in an image sensor to verify the encryption key was transmitted to the image sensor. For example, the application processor can verify successful transfer of the encryption key to an image sensor. Furthermore, the techniques described herein include detecting image data from the image sensor via the virtual channel, wherein the image data is encrypted with the encryption key.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

FIG. 1 is a block diagram of an example of a host computing device that can transmit encrypted image data. The host computing device 100 may be, for example, a mobile phone, laptop computer, desktop computer, or tablet computer, among others. The host computing device 100 may include a processor 102 that is adapted to execute stored instructions, as well as a memory device 104 that stores instructions that are executable by the processor 102 (also referred to herein as an application processor). The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can transmit encrypted image data.

The processor 102 may also be linked through the system interconnect 106 (e.g., PCI®, PCI-Express®, NuBus, etc.) to a display interface 108 adapted to connect the host computing device 100 to a display device 110. The display device 110 may include a display screen that is a built-in component of the host computing device 100. The display device 110 may also include a computer monitor, television, or projector, among others, that is externally connected to the host computing device 100. The display device 110 can include light emitting diodes (LEDs), and micro-LEDs, among others.

In addition, a network interface controller (also referred to herein as a NIC) 112 may be adapted to connect the host computing device 100 through the system interconnect 106 to a network (not depicted). The network (not depicted) may be a cellular network, a radio network, a wide area network (WAN), a local area network (LAN), or the Internet, among others.

The processor 102 may be connected through a system interconnect 106 to an input/output (I/O) device interface 114 adapted to connect the computing host device 100 to one or more I/O devices 116. The I/O devices 116 may include, for example, a keyboard and a pointing device, wherein the pointing device may include a touchpad or a touchscreen, among others. The I/O devices 116 may be built-in components of the host computing device 100, or may be devices that are externally connected to the host computing device 100.

In some embodiments, the processor 102 may also be linked through the system interconnect 106 to any suitable number of image sensors 118 through an image sensor interface 120. In some embodiments, the image sensor interface 120 can specify a transmission medium, input/output circuitry, and a clocking mechanism to enable capturing a data packet comprising image data from the image sensors 118. The image sensors can include any suitable sensor that can detect infrared information, digital image information, and the like. In some embodiments, the image sensors 118 can detect an encryption key from any suitable source and store the encryption key in a register. The image sensors 118 can also associate the encryption key with a virtual channel to form an encrypted virtual channel. As discussed above, each image sensor 118 can include any number of virtual channels that enable image data to be transmitted to the processor 102. In some examples, each virtual channel can be dedicated or assigned to transmitting infrared information, low resolution digital image information, or high resolution digital image information, among others. In some embodiments, the image sensors 118 can be enabled by the processor 102 to verify the encryption key based on a predefined test pattern by transmitting image data to the processor 102 via the encrypted virtual channel, wherein the image data is encrypted with the encryption key. In some examples, the image sensor interface 120 and the image sensors 118 can transmit image data using a legacy unidirectional link or a bidirectional link, or any other suitable transmission link.

In some embodiments, the processor 102 may also be linked through the system interconnect 106 to any storage device 122 that can include a hard drive, an optical drive, a USB flash drive, an array of drives, or any combinations thereof. In some embodiments, the storage device 122 can include any suitable applications. In some embodiments, the storage device 122 can include a virtual channel manager 124, an encryption key manager 126, and a data receiver 128. In some embodiments, the virtual channel manager 124 can select a virtual channel to be encrypted between an application processor, such as processor 102, and an image sensor 118 during an initialization process. For example, the virtual channel manager 124 can determine that the virtual channel corresponds to sensitive information to be protected from unauthorized access. The virtual channel manager 124 can also transmit a virtual channel command corresponding to the selected virtual channel to the image sensor 118. For example, the virtual channel command can instruct an image sensor 118 to detect and store an encryption key associated with a particular virtual channel. In some embodiments, the encryption key manager 126 can transmit an encryption key detection command to the image sensor 118, wherein the encryption key detection command can indicate a technique to be used by the image sensor 118 to detect the encryption key. The encryption key manager 126 can also poll a register in the image sensor 118 to verify the encryption key the image sensor 118 has stored corresponding to the selected virtual channel. The data receiver 128 can detect image data from the image sensor 118 via the virtual channel, wherein the image data is encrypted with the encryption key.

It is to be understood that the block diagram of FIG. 1 is not intended to indicate that the host computing device 100 is to include all of the components shown in FIG. 1. Rather, the host computing device 100 can include fewer or additional components not illustrated in FIG. 1 (e.g., additional memory components, embedded controllers, additional modules, additional network interfaces, etc.). Furthermore, any of the functionalities of the virtual channel manager 124, encryption key manager 126, and data receiver 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the virtual channel manager 124, encryption key manager 126, and data receiver 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
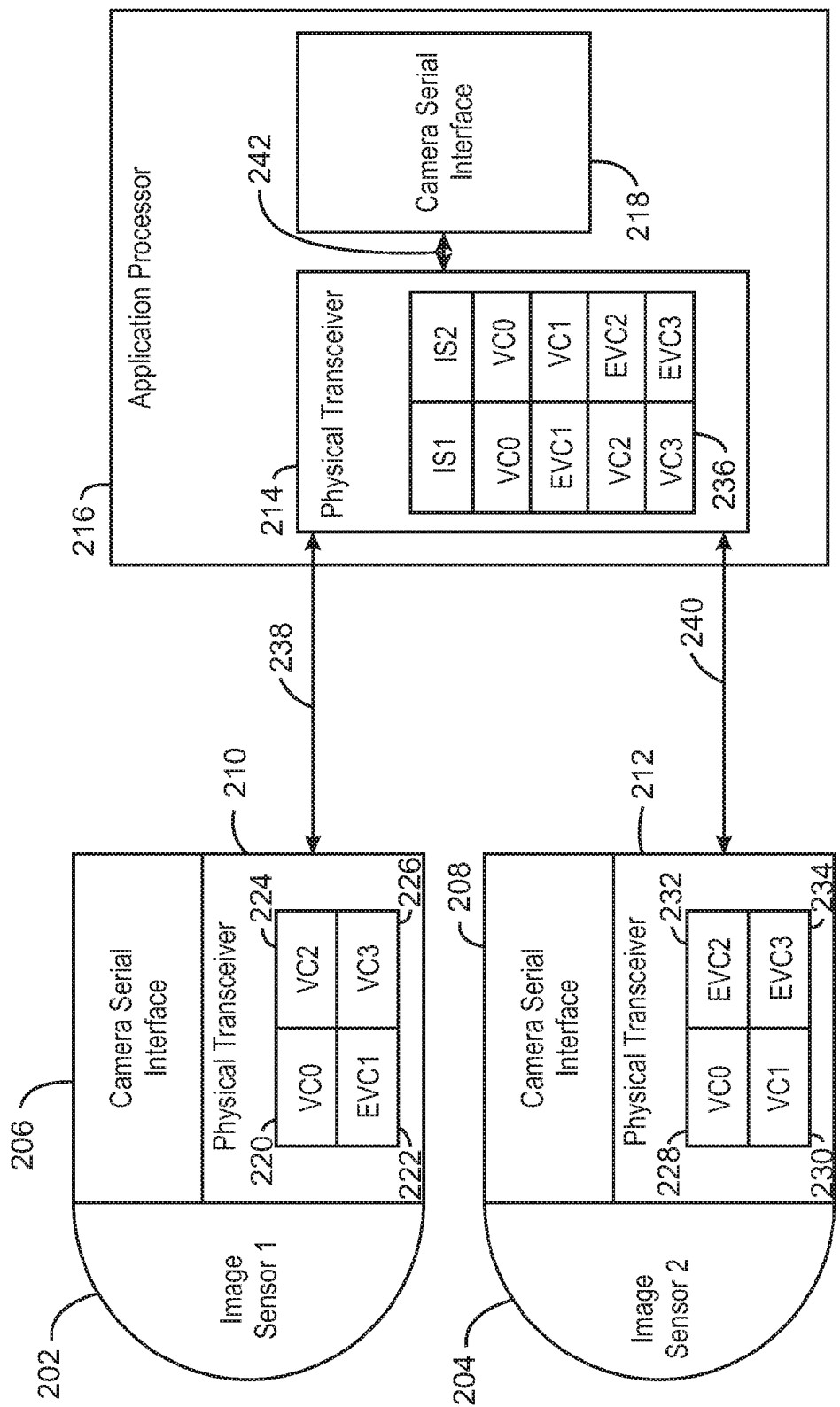
FIG. 2 illustrates a block diagram of an application processor and two image sensors transmitting encrypted image data.

FIG. 2 illustrates a block diagram of an application processor and two image sensors transmitting encrypted image data. In some embodiments, the image sensors 202 and 204 can include any suitable camera serial interface 206 and 208 and any suitable physical transceiver 210 and 212. For example, the camera serial interface 206 and 208 can communicate using any suitable protocol such as a PHY protocol interface (also referred to herein as PPI), among others. In some examples, the physical transceivers 210 and 212 can transmit image data to a physical transceiver 214 of an application processor 216. The physical transceivers 210, 212, and 214 can specify a transmission medium, input/output circuitry, and a clocking mechanism to enable capturing a data packet comprising a camera management command or image data. As discussed above, an application processor 216 can include a processor, circuit, logic, system on a chip, and the like, that can generate, detect, and transmit camera management commands and capture image data from the image sensors 202 and 204. In some embodiments, the physical transceiver 214 of the application processor 216 can transmit data to a camera serial interface 218 of the application processor 216 using any suitable protocol such as a PHY protocol interface, and the like.

In some embodiments, the camera serial interface 218 of the application processor 216 operates as a master device and the camera serial interfaces 206 and 208 of the image sensors 202 and 204 operate as slave devices. The camera serial interface 218 of the application processor 216 can transmit any number of camera management commands to the camera serial interfaces 206 and 208 of the image sensors 202 and 204 using the protocol recognized by the physical transceivers 210 and 212. In some embodiments, the physical transceiver 214 can transmit camera management commands from the application processor 216 to the image sensors 202 and 204 and the physical transceivers 210 and 212 can transmit image data from the image sensors 202 and 204 to the application processor 216.

In some embodiments, each physical transceiver 210 and 212 of the image sensors 202 and 204 can transmit image data using any suitable number of virtual channels. For example, image sensor 202 can include four virtual channels VC0 220, EVC1, 222, VC2 224, and VC3 226. In the example illustrated in FIG. 2, virtual channel 1 (EVC1 222) is designated as an encrypted virtual channel (EVC). Image sensor 204 may also include four virtual channels VC0 228, VC1, 230, EVC2 232, and EVC3 234. In one example, virtual channel two (EVC2 232) and virtual channel three (EVC3 234) of image sensor 204 can be encrypted. In some embodiments, the physical transceiver 214 of the application processor 216 can include a table 236 that corresponds to each virtual channel of each image sensor 202 and 204. In some embodiments, the physical transceiver 214 can store a separate encryption key for each encrypted virtual channel such as EVC1 222, EVC2 232, and EVC3 234. The physical transceiver 214 can use each encryption key to decrypt image data received from image sensors 202 and 204. The physical transceiver 214 can send the decrypted image data to the camera serial interface 218 of the application processor 216 via transmission link 242, which can be any suitable bidirectional serial link, or unidirectional link, among others.

In some embodiments, the physical transceiver 214 of the application processor 216 and the physical interfaces 210 and 212 of the image sensors 202 and 204 can transmit image data using any suitable transmission link 238 or 240. The transmission links 238 and 240 can be any suitable bidirectional serial link, unidirectional link, wireless link, microwave signal link, or optical signal link, among others.

It is to be understood that the block diagram of FIG. 2 is not intended to indicate that the image sensors 202 and 204 and the application processor 216 are to include all of the components shown in FIG. 2. Rather, the image sensors 202 and 204 and the application processor 216 can include fewer or additional components not illustrated in FIG. 2 (e.g., additional memory components, embedded controllers, additional sensors, additional interfaces, etc.). For example, in some embodiments, the physical transceivers 210 and 212 can be connected to physical transceiver 214 with separate unidirectional data lanes dedicated to transmitting data from the image sensors 202 and 204 to the application processor 216 (also referred to herein as a forward mode) or from the application processor 216 to the image sensors 202 and 204 (also referred to herein as a reverse mode). In other examples, the data lanes that connect the physical transceivers 210 and 212 to physical transceiver 214 are bidirectional and can transmit data in a forward mode and a reverse mode. In some embodiments, the application processor 216 can include a secure decrypting microprocessor that can decrypt encrypted image data and provide the decrypted image data to the physical transceiver 214. In some examples, the secure decrypting microprocessor may not process unencrypted data from unencrypted virtual channels.

In some embodiments, an image sensor 202 or 204 may receive configuration commands from an application processor 216 using any suitable protocol such as a CSI-2 protocol that uses a bidirectional camera command interface (CCI) over a bidirectional transmission link such as I2C. The configuration commands can enable the application processor 216 to configure the image sensors 202 or 204 to capture image data at a predetermined frame rate, capture image data with a predetermined bit per pixel information, or use a particular virtual channel as an encrypted virtual channel, among others. In some examples, a separate unidirectional C-PHY or D-PHY transmission link can transfer image data via encrypted or non-encrypted virtual channels from the image sensors 202 or 204 to the application processor 216. In some examples, a separate pipeline may be included in the application processor 216 to decrypt and process encrypted image data transferred via a CSI-2 protocol.

In some embodiments, a unified streaming architecture can use a single interface with C-PHY or D-PHY transceivers in image sensors 202 or 204 and application processor 216. The CCI image sensor configurations can be transferred from the application processor 216 to the image sensors 202 and 204 via the C-PHY or D-PHY transceiver as opposed to a separate I2C interface.

Figure 3:
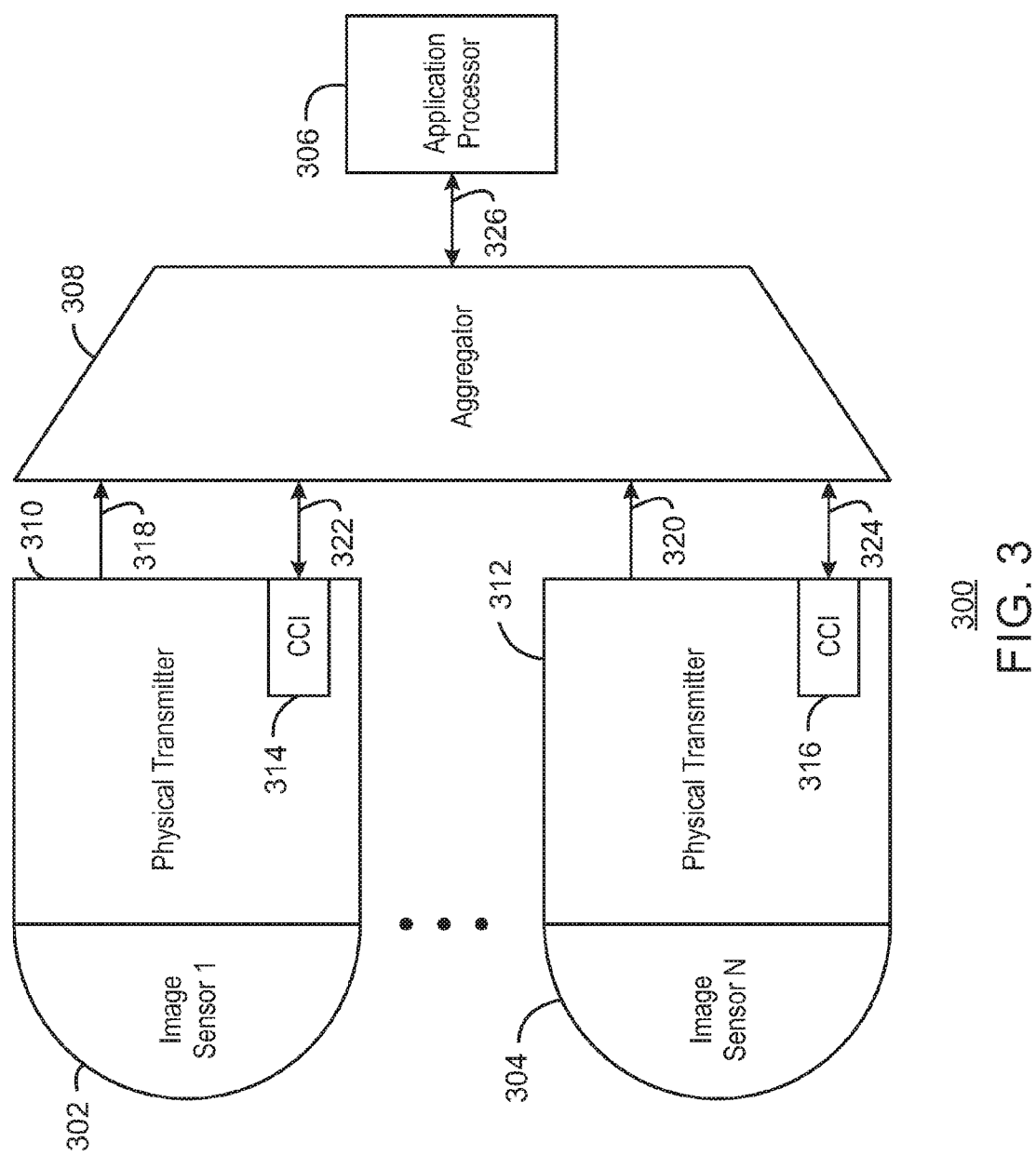
FIG. 3 illustrates a block diagram of an application processor configuring two image sensors for transmitting encrypted image data from FIG. 2 using an aggregator.

FIG. 3 illustrates a block diagram of an application processor configuring two image sensors for transmitting encrypted image data using an aggregator. In some embodiments, any suitable number of image sensors, such as image sensor 1 302 through image sensor N 304, can transmit image data to an application processor 306 via an aggregator 308. In some examples, the image sensor 1 302 through image sensor N 304 can each include a physical transmitter 310 or 312 and a camera command interface (CCI) 314 or 316. In some embodiments, the physical transmitters 310 and 312 can include any suitable number of virtual channels, which may or may not be encrypted. The physical transmitters 310 and 312 can transmit encrypted image data and unencrypted image data to the application processor 306 via the aggregator 308 and transmission links 318 and 320. In some embodiments, the camera command interfaces (CCI) 314 and 316 can receive camera management commands from the application processor 306 via a bidirectional link 322 or 324. In some embodiments, the transmission link 326 can transmit image data between the aggregator 308 and the application processor 306 using any suitable bidirectional serial link, unidirectional link, wireless link, microwave signal link, or optical signal link, among others. For example, the illustrated aggregator 308 can use a Unified Streaming Interface (or single bidirectional transceiver link) 326 to connect to the application processor 306, and legacy dual interfaces to connect to the image sensors 302 or 304. In some embodiments, two image sensors 302 or 304 may not transmit image data using the same virtual channel. Accordingly, the aggregator 308 can detect and transmit image data for a virtual channel from one image sensor of a set of image sensors 302 and 304.

When using an aggregator 308 in a system, during an initial power-up configuration, the application processor 306 can configure a unique virtual channel for each image sensor 302 and 304 corresponding to frame data types such as RAW, JPEG, and Metadata, among others. When the frame payloads are aggregated and transferred to the application processor 306, the virtual channels can be used to determine the specific image sensor 302 or 304, and the configured frame data type.

It is to be understood that the block diagram of FIG. 3 is not intended to indicate that the image sensors 302 and 304 and the application processor 306 are to include all of the components shown in FIG. 3. Rather, the image sensors 302 and 304 and the application processor 306 can include fewer or additional components not illustrated in FIG. 3 (e.g., additional memory components, embedded controllers, additional sensors, additional interfaces, etc.).

Figure 4:
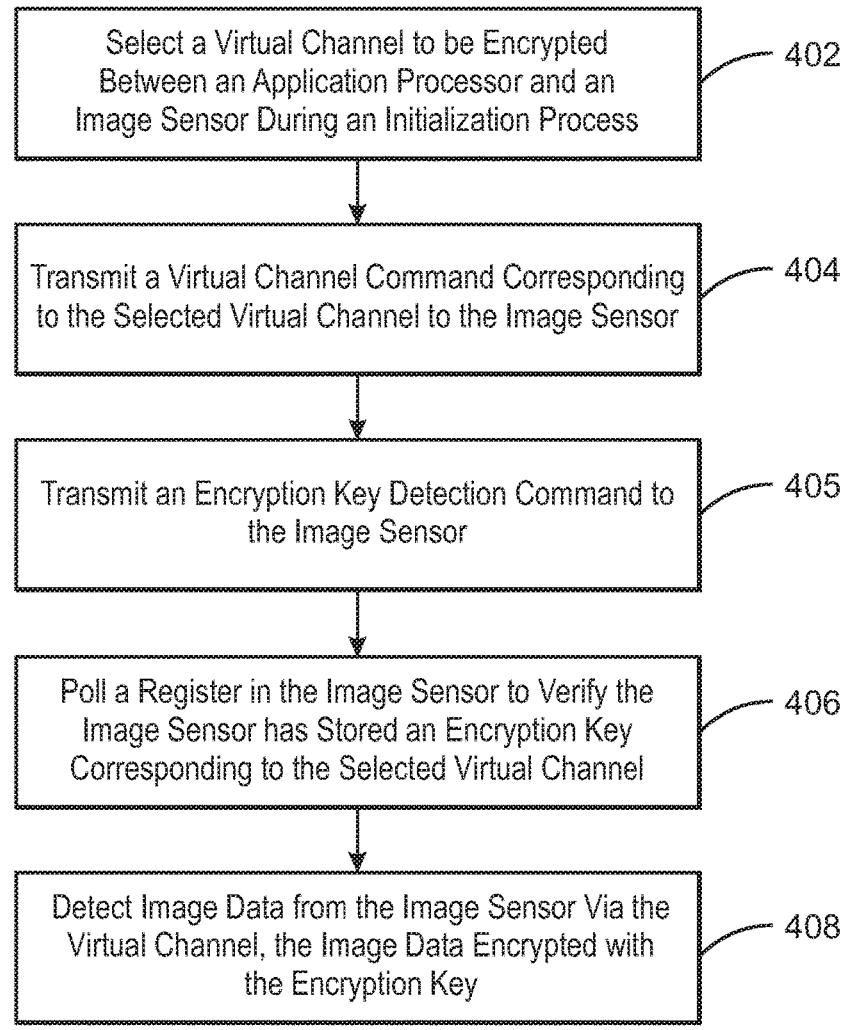
FIG. 4 illustrates a process flow diagram for configuring an image sensor to transfer encrypted data to an application processor.

FIG. 4 illustrates a process flow diagram for configuring an image sensor to transfer encrypted data to an application processor. The method 400 illustrated in FIG. 4 can be implemented with any suitable computing component or device, such as the computing device 100 of FIG. 1.

At block 402, a virtual channel manager 124 of an application processor can select a virtual channel to be encrypted between an application processor and an image sensor during an initialization process. In some embodiments, the virtual channel manager 124 can select the virtual channel to be encrypted from a set of virtual channels corresponding to the image sensor. In some examples, the virtual channel manager 124 can select any number of virtual channels to be encrypted for any number of image sensors. As discussed above, each virtual channel can transmit image data such as infrared information, low resolution digital image information, high resolution digital image information, retinal scan information, fingerprint scan information, security information, and the like. In some embodiments, the virtual channel manager 124 can select the virtual channel to be encrypted based on information transmitted by the virtual channel. For example, virtual channels assigned to transmit secure data, such as information from retinal scans or fingerprint scans, can be encrypted to avoid unauthorized access as the secure information is transmitted between an image sensor and an application processor. In some embodiments, the virtual channel manager 124 can also select virtual channels to be encrypted based on applications utilizing the information. For example, applications that involve real-time processing or control automated vehicles may transmit image data via an application processor and image sensor using encrypted virtual channels. In some examples, each virtual channel may transmit image data based on a predetermined frame rate, a predetermined number of bits per pixel, and the like.

At block 404, the virtual channel manager 124 can transmit a virtual channel command corresponding to the selected virtual channel to the image sensor. In some embodiments, the virtual channel manager 124 can transmit the virtual channel command in a camera management command via a unified architecture, which is a bidirectional camera serial interface link that can transmit camera management commands and image data. The camera management command can include any suitable update command, write command, read command, and the like. In some embodiments, the camera management command can indicate a particular virtual channel to transmit encrypted data based on an encryption key. The camera management command or the virtual channel command can also indicate to an image sensor that the image sensor is to attempt to detect an encryption key. In some embodiments, the camera management command or virtual channel command can indicate a period of time for the image sensor to poll for an encryption key. In some examples, the virtual channel command can set a register value in the image sensor.

In some embodiments, the virtual channel manager 124 can embed the camera management command in a data packet. For example, the virtual channel manager 124 may generate data packets based on a D-PHY interface or a C-PHY interface. For example, the virtual channel manager 124 may generate packets to be transmitted using a bidirectional differential interface comprising a two-wire clock lane and one or more two-wire data lanes or a bidirectional differential interface comprising one or more two-wire data lanes. The virtual channel manager 124 can modify the packet header information for data packets to be transmitted using either the D-PHY interface or the C-PHY interface. In some examples, the virtual channel manager 124 can modify virtual channel bits, unused reserved bits, or unused data type bits in the packet header to transmit the virtual channel command. For example, the virtual channel manager 124 can modify a legacy reserved data type field so that a value from the reserved data type field indicates that the data packet corresponds to a virtual channel command. In some embodiments, an image sensor can generate a negative acknowledgment for any camera management command. The negative acknowledgment can include the camera management command with a packet header modified to indicate the camera management command failed to be executed by the image sensor. The packet header can be modified to use a reserved bit, a virtual channel bit, or unused data type bits to indicate the negative acknowledgment. In some embodiments, the virtual channel manager 124 can generate a packet for the image data. In some examples, the packet can include header information and the encrypted image data, wherein the header information comprises a virtual channel identifier indicating the virtual channel to be encrypted.

At block 405, the encryption key manager 126 can transmit an encryption key detection command to the image sensor, wherein the encryption key detection command indicates a technique to be used by the image sensor to detect the encryption key. For example, the encryption key detection command can indicate that the image sensor is to detect an encryption key directly from the application processor using an uncompromised link, from an infrared transmitter, or from a grid-to-bit figure, among others. In some examples, the encryption key detection command can set a register value in the image sensor. The techniques used by image sensors to detect encryption keys are described in greater detail below in relation to FIG. 5.

At block 406, an encryption key manager 126 can poll a register in the image sensor to verify the image sensor has stored an encryption key corresponding to the selected virtual channel. For example, an image sensor may attempt to detect an encryption key for a period of time in response to receiving the virtual channel command from the application processor. In some embodiments, the encryption key manager 126 can access a register in the image sensor continuously to detect if an encryption key has been stored in the register. In some examples, the encryption key manager 126 can generate a table comprising a plurality of encryption keys for a plurality of virtual channels to be encrypted and use the table to verify the encryption keys stored in the register of the image sensor. For example, the encryption key manager 126 can verify that each encryption key stored in an image sensor corresponds to a virtual channel to be encrypted.

At block 408, a data receiver 128 can detect image data from the image sensor via the virtual channel, wherein the image data is encrypted with the encryption key. Image data, as referred to herein, can include any information corresponding to pixels for digital photography. In some embodiments, image data is captured using row by row techniques. Accordingly, each row of pixel data corresponding to a digital image captured by an image sensor can be transmitted in a single data packet. In some examples, an image sensor generates a number of data packets of image data equal to a number of rows of resolution of a digital image. As discussed above, the image data can be encrypted using the encryption key stored in the image sensor and transmitted to the data receiver 128 in any suitable data packet. The data receiver 128 can then access a locally stored copy of the encryption key to decrypt and process the image data from the image sensor. In some embodiments, the data receiver 128 can decrypt the image data by selecting an encryption key from a table of encryption keys based on the virtual channel used to transmit the image data and the image sensor transmitting the image data.

In some embodiments, the data receiver 128 can transmit a test command to an image sensor to verify test image data from the image sensor. For example, the data receiver 128 can verify that test image data received from an image sensor matches expected encrypted image data. In some embodiments, the data receiver 128 can detect the image data from the image sensor via an aggregator. As discussed above in relation to FIG. 3, the aggregator can transmit image data to the processor from at least two image sensors.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, in some embodiments, the image sensor can connect to any number of sensors or devices using an I2C interface, or any other suitable interface. The image sensor can use a mapper to perform read or write operations to the connected sensors and other I2C devices. In some examples, the sensors and other I2C devices are designated by a slave address and a sub address included in a camera management command. If the I2C devices generate a negative acknowledgment as a result of executing the camera management command from an application processor, the camera management command can be sent back to the application processor with the packet header modified to include a bit from the data type field, virtual channel field, or unused reserved data field indicating the negative acknowledgment.

In some embodiments, the encryption key manager 126 can also transmit an encryption key from the application processor to an image sensor via a transmission link that is verified to be uncompromised. For example, the transmission link may be coupled to the application processor and image sensor in a secure location and the transmission link may be monitored to detect if data is being retrieved from the transmission link by an unauthorized source. In some embodiments, the encryption key manager 126 can transmit an instruction to the image sensor to provide an electrical current to a low resistance resistor, wherein the electrical current can interrupt a circuit in the image sensor. The instruction can thus prevent an image sensor from storing additional encryption keys or updating the current encryption key stored on the image sensor. In some embodiments, the data receiver 128 can receive unencrypted image data from the image sensor via a unified architecture transmission link and the encrypted image data from the image sensor via a secure decrypting microprocessor.

Figure 5:
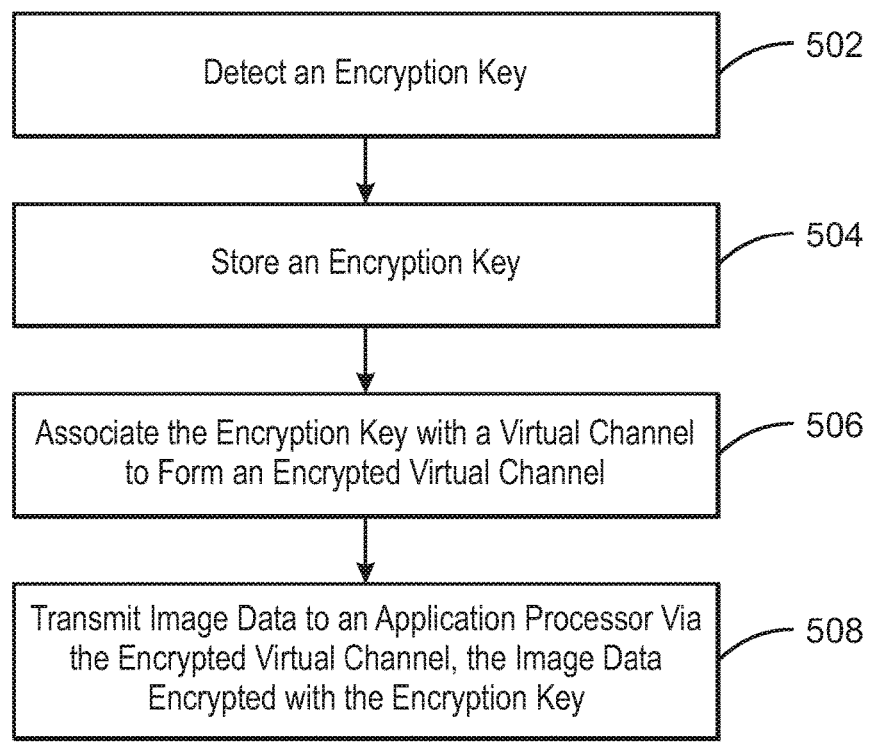
FIG. 5 illustrates a process flow diagram for transmitting encrypted image data from an image sensor.

FIG. 5 illustrates a process flow diagram for transmitting encrypted image data from an image sensor. The method 500 illustrated in FIG. 5 can be implemented with any suitable computing component or device, such as the image sensors 118 of FIG. 1.

At block 502, an image sensor can detect an encryption key. In some embodiments, the image sensor can detect the encryption key from an application processor via an uncompromised transmission link, from an infrared transmitter, or from a grid-to-bit figure. In some examples, a separate infrared transmitter device can provide the encryption key to the image sensor by displaying the encryption key as infrared information to enable the image sensor to detect the infrared information. For example, an infrared transmitter can be placed in front of the image sensor to transmit the encryption key. In some examples, the infrared transmitter may not be electrically coupled to the application processor.

In some embodiments, a grid-to-bit figure can be placed in front of the image sensor to transmit the encryption key. The grid-to-bit figures can encode an encryption key in black and white boxes, or boxes of any color, which can be detected by the image sensor when the grid-to-bit figure is placed in front of the image sensor. In some examples, the grid-to-bit figure can include alternating configuration black and white boxes along the inner perimeter of the grid-to-bit figure, and encryption black and white boxes inside the configuration black and white boxes, wherein each of the encryption black and white boxes corresponds to bits of the encryption key. The grid-to-bit figure is described in greater detail below in relation to FIG. 6.

At block 504, the image sensor can store the encryption key in a register. For example, the image sensor can have a register associated with each virtual channel and the image sensor can store an encryption key associated with a virtual channel in a corresponding register.

At block 506, the image sensor can associate the encryption key with a virtual channel to form an encrypted virtual channel. As discussed above, each virtual channel may be encrypted with a different encryption key. Accordingly, the image sensor can determine which virtual channel to associate with a detected encryption key. In some embodiments, the image sensor receives the virtual channel command from an application processor and begins a detection period for receiving the encryption key.

At block 508, the image sensor can transmit image data to an application processor via the encrypted virtual channel, wherein the image data can be encrypted with the encryption key. For example, any number of rows of image data can be encrypted and transmitted to the application processor via the encrypted virtual channel.

The process flow diagram of FIG. 5 is not intended to indicate that the operations of the method 500 are to be executed in any particular order, or that all of the operations of the method 500 are to be included in every case. Additionally, the method 500 can include any suitable number of additional operations. For example, the image sensor can provide an electrical current to a low resistance resistor, wherein the electrical current is to interrupt a circuit or blow a fuse in the image sensor. In some embodiments, the electrical current can prevent the image sensor from receiving an updated encryption key. In some embodiments, the image sensor encrypts image data in each long packet and may optionally transmit data in short packets unencrypted. In some examples, a camera serial interface long packet can include a packet header, packet data, and a packet footer. If the packet header virtual channel bit is configured as an encrypted virtual channel bit in an image sensor by an application processor, the packet data corresponding to the encrypted virtual channel can be encrypted using any suitable encryption technique such as advanced encryption standard, an asymmetric encryption technique, or any other suitable encryption technique. In some examples, a camera serial interface using C-PHY or D-PHY can transmit short packets that include a data identifier, 16-bits of short packet data, and a VCX value that indicates a virtual channel. In some examples, depending on the imaging application needs, the 16-bit short packet data may be optionally encrypted if the virtual channel is designated as an encrypted virtual channel. When configuring a virtual channel as an encrypted virtual channel in an image sensor, the application processor may also configure an image sensor register to encrypt the 16-bit short packet data in addition to the long packet data. In some embodiments, the image sensor includes infrared receivers embedded within photon sensors.

In some embodiments, an image sensor can be enabled by an application processor to verify the encryption key based on a predefined test pattern. In some embodiments, an image sensor receives a predefined test pattern or test image or detects an internally stored test image and transmits the image data corresponding to the predefined test pattern to an application processor using an encrypted virtual channel. For example, an image sensor can generate a packet for the image data, the packet including header information and the encrypted image data, wherein the header information can include at least a virtual channel identifier. The application processor can verify that the encrypted image data matches expected encrypted image data.

Figure 6:
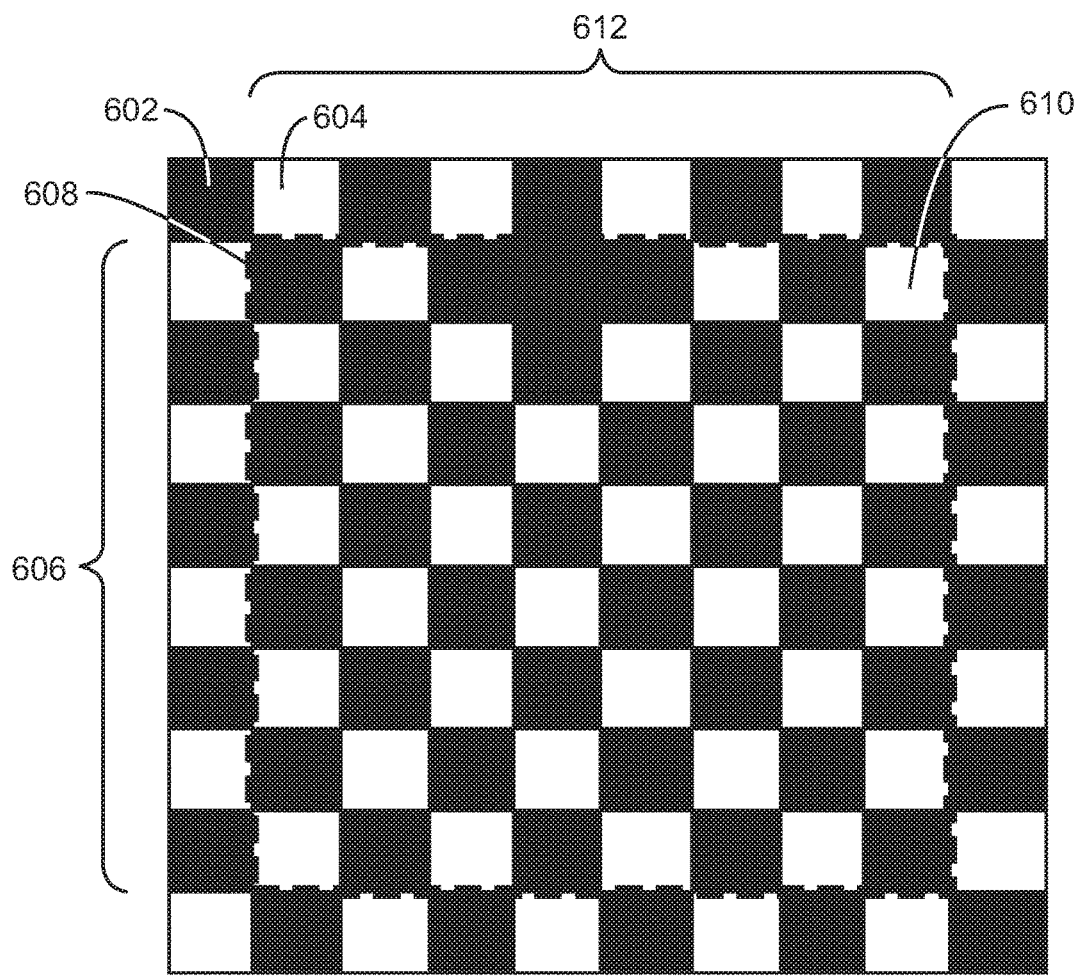
FIG. 6 is an example of a grid-to-bit figure that can provide an encryption key.

FIG. 6 is an example of a grid-to-bit figure that can provide an encryption key. In some embodiments, the grid-to-bit FIG. 600 can include a depiction of an encryption key to be transmitted to an image sensor. For example, the grid-to-box FIG. 600 can include alternating configuration black 602 and white 604 boxes adjacent to the outer perimeter. The alternating configuration black and white boxes can enable an image sensor to center on the grid-to-box FIG. 600. The encryption black and white boxes 606 inside or between the configuration black 602 and white 604 boxes can transmit an encryption key. The encryption black and white boxes 606 of grid-to-bit FIG. 600 are inside of the dotted line. For example, the leftmost box 608 can indicate a most significant bit of an encryption key and the rightmost box 610 can indicate a least significant bit of an encryption key. Each of the encryption black and white boxes 606 can correspond to a one or zero binary value. Accordingly, the example grid-to-bit FIG. 600 includes a 10111010 bit value in the top row 612. In some embodiments, a black box can correspond to a one or zero value and a white box can correspond to an opposite binary value.

In some embodiments, a grid-to-bit FIG. 600 can include any suitable number of black and white boxes to transmit an encryption key of any suitable length. Furthermore, any number of outer rows and columns can be used as configuration black and white boxes. Accordingly, the encryption black and white boxes 606 corresponding to an encryption key can be included in any suitable region of a grid-to-bit figure. Furthermore, any suitable colors of boxes can be used.

Figure 7:
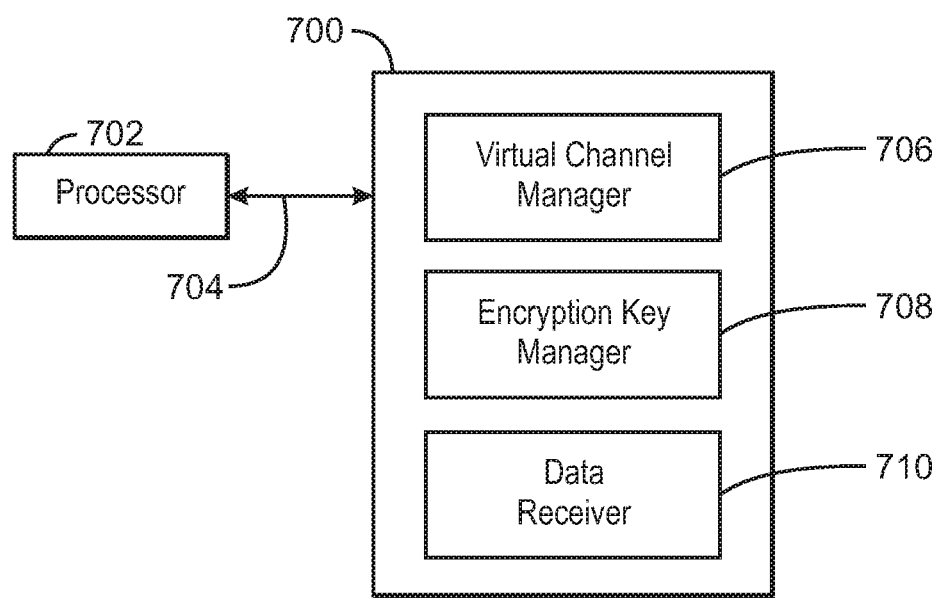
FIG. 7 is an example of a tangible, non-transitory computer-readable medium for an application processor to enable transmission of encrypted image data.

FIG. 7 illustrates a block diagram of a non-transitory computer readable media for an application processor to enable an image sensor to transmit encrypted image data. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the current method.

The various software components discussed herein may be stored on the tangible, non-transitory, computer-readable medium 700, as indicated in FIG. 7. For example, a virtual channel manager 706 can select a virtual channel to be encrypted between an application processor and an image sensor during an initialization process and transmit a virtual channel command corresponding to the selected virtual channel to the image sensor. In some embodiments, an encryption key manager 708 can poll a register in the image sensor to verify the image sensor has stored an encryption key corresponding to the selected virtual channel. In some embodiments, a data receiver 710 can detect image data from the image sensor via the virtual channel, wherein the image data can be encrypted with the encryption key.

It is to be understood that any suitable number of the software components shown in FIG. 7 may be included within the tangible, non-transitory computer-readable medium 700. Furthermore, any number of additional software components not shown in FIG. 7 may be included within the tangible, non-transitory, computer-readable medium 700, depending on the specific application.

Figure 8:
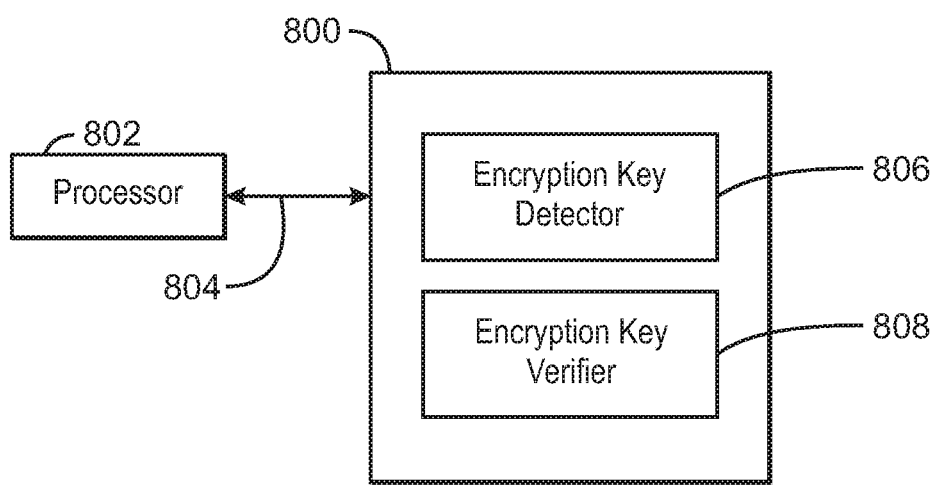
FIG. 8 is an example of a tangible, non-transitory computer-readable medium for transmitting encrypted image data from an image sensor.

FIG. 8 is an example block diagram of a non-transitory computer readable media for transmitting encrypted image data from an image sensor. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the current method.

The various software components discussed herein may be stored on the tangible, non-transitory, computer-readable medium 800, as indicated in FIG. 8. For example, an encryption key detector 806 can detect an encryption key and store the encryption key in a register. In some embodiments, the encryption key detector 806 can also associate the encryption key with a virtual channel to form an encrypted virtual channel. In some examples, an encryption key verifier 808 can verify the encryption key based on a predefined test pattern and transmit image data to an application processor via the encrypted virtual channel, wherein the image data is encrypted with the encryption key.

It is to be understood that any suitable number of the software components shown in FIG. 8 may be included within the tangible, non-transitory computer-readable medium 800. Furthermore, any number of additional software components not shown in FIG. 8 may be included within the tangible, non-transitory, computer-readable medium 800, depending on the specific application.

Figure 9:
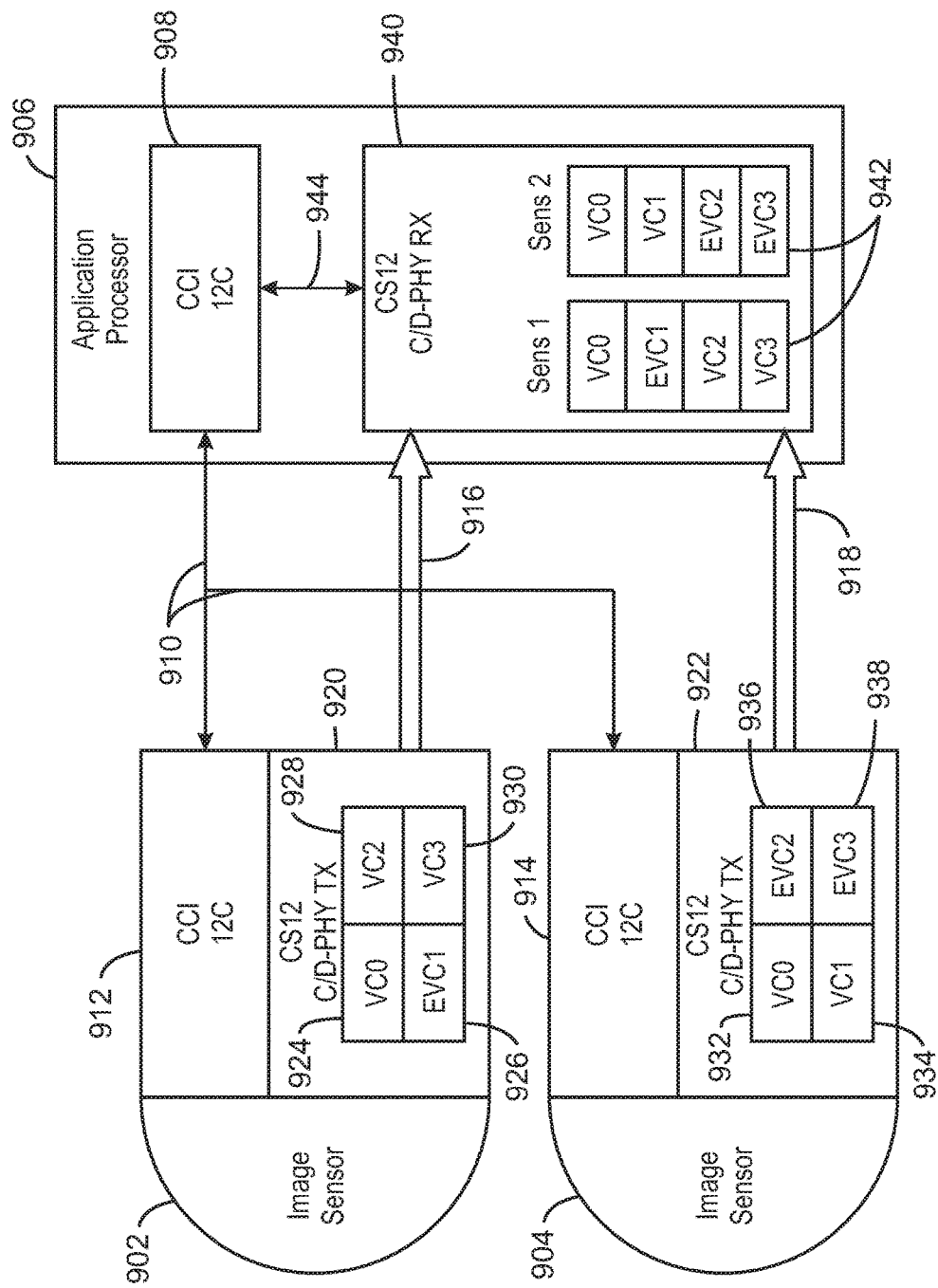
FIG. 9 a block diagram of an application processor and two image sensors transmitting encrypted image data.

FIG. 9 a block diagram of an application processor and two image sensors transmitting encrypted image data. In some embodiments, the image sensors 902 and 904 may receive configuration commands from an application processor 906 using any suitable protocol such as a CSI-2 protocol that uses a bidirectional camera command interface (CCI) 908 over a bidirectional transmission link 910 such as I2C, among others. The configuration commands can enable the application processor 906 to configure the image sensors 902 and 904 to capture image data at a predetermined frame rate, capture image data with a predetermined bit per pixel information, or use a particular virtual channel as an encrypted virtual channel, among others. In some embodiments, a CCI interface 912 or 914 in the image sensors 902 or 904 can transmit the configuration commands to the CCI interface 908 of the application processor 906. In some examples, a separate unidirectional C-PHY or D-PHY transmission link 916 or 918 can transfer image data via encrypted or non-encrypted virtual channels from the image sensors 902 or 904 to the application processor 906. In some examples, a separate pipeline may be included in the application processor 906 to decrypt and process encrypted image data transferred via a CSI-2 protocol.

In some embodiments, each physical transmitter 920 or 922 of the image sensors 902 or 904 can transmit image data using any suitable number of virtual channels. For example, image sensor 902 can include four virtual channels VC0 924, EVC1 926, VC2 928, and VC3 930. In the example illustrated in FIG. 9, virtual channel 1 926 is designated as an encrypted virtual channel (EVC1). Image sensor 904 may also include four virtual channels VC0 932, VC1 934, EVC2 936, and EVC3 938. In one example, virtual channel two (EVC2 936) and virtual channel three (EVC3 938) of image sensor 904 can be encrypted. In some embodiments, the physical transmitter 940 of the application processor 906 can include a table 942 that corresponds to each virtual channel of each image sensor 902 or 904. In some embodiments, the physical transmitter 940 can store a separate encryption key for each encrypted virtual channel such as EVC1 926, EVC2 936, and EVC3 938. The physical transmitter 940 can use each encryption key to decrypt image data received from image sensors 902 or 904. The physical transmitter 940 can also send the decrypted image data to the camera serial interface 908 of the application processor 906 via a transmission link 944.

It is to be understood that the block diagram of FIG. 9 is not intended to indicate that the image sensors 902 and 904 and the application processor 906 are to include all of the components shown in FIG. 9. Rather, the image sensors 902 and 904 and the application processor 906 can include fewer or additional components not illustrated in FIG. 9 (e.g., additional memory components, embedded controllers, additional sensors, additional interfaces, etc.).

Example 1

In some examples, a system for transmitting encrypted image data can include a processor to select a virtual channel to be encrypted between an application processor and an image sensor during an initialization process and transmit a virtual channel command corresponding to the selected virtual channel to the image sensor. The processor can also transmit an encryption key detection command to the image sensor, the encryption key detection command to indicate a technique to be used by the image sensor to detect an encryption key and poll a register in the image sensor to verify the image sensor has stored the encryption key corresponding to the selected virtual channel. Furthermore, the processor can detect image data from the image sensor via the virtual channel, the image data encrypted with the encryption key.

In some examples, the processor can transmit the encryption key to the image sensor via a unified architecture link. In some embodiments, the processor can transmit the encryption key to the image sensor via a transmission link, the transmission link to be verified as uncompromised. In some embodiments, the processor can select the virtual channel to be encrypted from a set of virtual channels corresponding to the image sensor. In some embodiments, the processor can generate a packet for the image data, the packet comprising header information and the encrypted image data. In some embodiments, the header information comprises a virtual channel indicator indicating the virtual channel to be encrypted. In some embodiments, the processor can detect the image data from the image sensor via an aggregator, the aggregator to transmit image data to the processor from at least two image sensors. In some embodiments, the virtual channel to be encrypted is assigned to transmitting real-time processing image data or secure image data. In some embodiments, the processor can transmit a test image to the image sensor and verify the image data matches expected encrypted image data. In some embodiments, the processor can transmit an instruction to the image sensor to provide an electrical current to a low resistance resistor, the electrical current to interrupt a circuit in the image sensor. In some embodiments, the processor can generate a table comprising a plurality of encryption keys for a plurality of virtual channels to be encrypted. In some embodiments, the processor can receive unencrypted image data from the image sensor via a unified architecture transmission link and the encrypted image data from the image sensor via a secure decrypting microprocessor. In some embodiments, the aggregator is to transmit image data for a plurality of virtual channels, wherein each virtual channel corresponds to an image sensor.

Example 2

In some examples, a system for transmitting encrypted image data can include a processor to detect an encryption key in an image sensor and store the encryption key in a register of the image sensor. The processor can also associate the encryption key with a virtual channel to form an encrypted virtual channel and transmit image data to an application processor from the image sensor via the encrypted virtual channel, the image data encrypted with the encryption key.

In some examples, the processor can provide an electrical current to a low resistance resistor, the electrical current to interrupt a circuit in the image sensor. In some examples, the electrical current is to prevent the image sensor from receiving an updated encryption key. The processor can also detect the encryption key from an infrared transmitter or detect the encryption key from a grid-to-bit figure. In some examples, the grid-to-bit figure comprises alternating configuration black and white boxes along the inner perimeter of the grid-to-bit figure, and encryption black and white boxes inside the configuration black and white boxes, wherein each of the encryption black and white boxes corresponds to a bit from the encryption key. In some examples, the processor is to generate a packet for the image data, the packet comprising header information and the encrypted image data, wherein the header information comprises a virtual channel indicator. In some examples, the image sensor comprises infrared receivers embedded within photon sensors.

Example 3

In some examples, a method for transmitting encrypted image data can include selecting a virtual channel to be encrypted between an application processor and an image sensor during an initialization process. The method can also include transmitting a virtual channel command corresponding to the selected virtual channel to the image sensor. Additionally, the method can include transmitting an encryption key detection command to the image sensor, the encryption key detection command to indicate a technique to be used by the image sensor to detect an encryption key. Furthermore, the method can include polling a register in the image sensor to verify the image sensor has stored the encryption key corresponding to the selected virtual channel. In addition, the method can include detecting image data from the image sensor via the virtual channel, the image data encrypted with the encryption key.

In some examples, the method can include transmitting the encryption key to the image sensor via a unified architecture link. In some embodiments, the method can include transmitting the encryption key to the image sensor via a transmission link, the transmission link to be verified as uncompromised. In some embodiments, the method can include selecting the virtual channel to be encrypted from a set of virtual channels corresponding to the image sensor. In some embodiments, method can include generating a packet for the image data, the packet comprising header information and the encrypted image data. In some embodiments, the header information comprises a virtual channel indicator indicating the virtual channel to be encrypted. In some embodiments, the method can include detecting the image data from the image sensor via an aggregator, the aggregator to transmit image data to the processor from at least two image sensors. In some embodiments, the virtual channel to be encrypted is assigned to transmitting real-time processing image data or secure image data. In some embodiments, the method can include transmitting a test image to the image sensor and verifying the image data matches expected encrypted image data. In some embodiments, the method can include transmitting an instruction to the image sensor to provide an electrical current to a low resistance resistor, the electrical current to interrupt a circuit in the image sensor. In some embodiments, the method can include generating a table comprising a plurality of encryption keys for a plurality of virtual channels to be encrypted. In some embodiments, the method can include receiving unencrypted image data from the image sensor via a unified architecture transmission link and receiving the encrypted image data from the image sensor via a secure decrypting microprocessor. In some embodiments, the method can include the aggregator transmitting image data for a plurality of virtual channels, wherein each virtual channel corresponds to an image sensor.

Example 4

In some examples, a method for transmitting encrypted image data can include detecting an encryption key in an image sensor and storing the encryption key in a register of the image sensor. The method can also include associating the encryption key with a virtual channel to form an encrypted virtual channel and transmitting image data to an application processor from the image sensor via the encrypted virtual channel, the image data encrypted with the encryption key.

In some examples, the method can include providing an electrical current to a low resistance resistor, the electrical current to interrupt a circuit in the image sensor. In some examples, the electrical current is to prevent the image sensor from receiving an updated encryption key. The method can also include detecting the encryption key from an infrared transmitter or detecting the encryption key from a grid-to-bit figure. In some examples, the grid-to-bit figure comprises alternating configuration black and white boxes along the inner perimeter of the grid-to-bit figure, and encryption black and white boxes inside the configuration black and white boxes, wherein each of the encryption black and white boxes corresponds to a bit from the encryption key. In some examples, the method can also include generating a packet for the image data, the packet comprising header information and the encrypted image data, wherein the header information comprises a virtual channel indicator. In some examples, the image sensor comprises infrared receivers embedded within photon sensors.

Example 5

In some examples, a non-transitory computer readable media for transmitting encrypted image data can include a plurality of instructions that, in response to execution by a processor, cause the processor to select a virtual channel to be encrypted between an application processor and an image sensor during an initialization process and transmit a virtual channel command corresponding to the selected virtual channel to the image sensor. The plurality of instructions can also cause the processor to transmit an encryption key detection command to the image sensor, the encryption key detection command to indicate a technique to be used by the image sensor to detect an encryption key and poll a register in the image sensor to verify the image sensor has stored the encryption key corresponding to the selected virtual channel. Furthermore, the plurality of instructions can also cause the processor to detect image data from the image sensor via the virtual channel, the image data encrypted with the encryption key.

In some examples, the plurality of instructions can also cause the processor to transmit the encryption key to the image sensor via a unified architecture link. In some embodiments, the plurality of instructions can also cause the processor to transmit the encryption key to the image sensor via a transmission link, the transmission link to be verified as uncompromised. In some embodiments, the plurality of instructions can also cause the processor to select the virtual channel to be encrypted from a set of virtual channels corresponding to the image sensor. In some embodiments, the plurality of instructions can also cause the processor to generate a packet for the image data, the packet comprising header information and the encrypted image data. In some embodiments, the header information comprises a virtual channel indicator indicating the virtual channel to be encrypted. In some embodiments, the plurality of instructions can also cause the processor to detect the image data from the image sensor via an aggregator, the aggregator to transmit image data to the processor from at least two image sensors. In some embodiments, the virtual channel to be encrypted is assigned to transmitting real-time processing image data or secure image data. In some embodiments, the plurality of instructions can also cause the processor to transmit a test image to the image sensor and verify the image data matches expected encrypted image data. In some embodiments, the plurality of instructions can also cause the processor to transmit an instruction to the image sensor to provide an electrical current to a low resistance resistor, the electrical current to interrupt a circuit in the image sensor. In some embodiments, the plurality of instructions can also cause the processor to generate a table comprising a plurality of encryption keys for a plurality of virtual channels to be encrypted. In some embodiments, the plurality of instructions can also cause the processor to receive unencrypted image data from the image sensor via a unified architecture transmission link and the encrypted image data from the image sensor via a secure decrypting microprocessor. In some embodiments, the aggregator is to transmit image data for a plurality of virtual channels, wherein each virtual channel corresponds to an image sensor.

Example 6

In some examples, a non-transitory computer readable media for transmitting encrypted image data can include a plurality of instructions that, in response to being executed by a processor, cause the processor to detect an encryption key in an image sensor and store the encryption key in a register of the image sensor. The plurality of instructions can also cause the processor to associate the encryption key with a virtual channel to form an encrypted virtual channel and transmit image data to an application processor from the image sensor via the encrypted virtual channel, the image data encrypted with the encryption key.

In some examples, the plurality of instructions can also cause the processor to provide an electrical current to a low resistance resistor, the electrical current to interrupt a circuit in the image sensor. In some examples, the electrical current is to prevent the image sensor from receiving an updated encryption key. The plurality of instructions can also cause the processor to detect the encryption key from an infrared transmitter or detect the encryption key from a grid-to-bit figure. In some examples, the grid-to-bit figure comprises alternating configuration black and white boxes along the inner perimeter of the grid-to-bit figure, and encryption black and white boxes inside the configuration black and white boxes, wherein each of the encryption black and white boxes corresponds to a bit from the encryption key. In some examples, the plurality of instructions can also cause the processor to generate a packet for the image data, the packet comprising header information and the encrypted image data, wherein the header information comprises a virtual channel indicator. In some examples, the image sensor comprises infrared receivers embedded within photon sensors.

Although an example embodiment of the disclosed subject matter is described with reference to block and flow diagrams in FIGS. 1-9, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for transmitting encrypted image data comprising:
a processor to:
select a virtual channel to be encrypted between an application processor and an image sensor during an initialization process;
transmit a virtual channel command corresponding to the selected virtual channel to the image sensor;
transmit an encryption key detection command to the image sensor, the encryption key detection command to indicate a technique to be used by the image sensor to detect an encryption key;
poll a register in the image sensor to verify the image sensor has stored the encryption key corresponding to the selected virtual channel; and
detect image data from the image sensor via the virtual channel, the image data encrypted with the encryption key.

2. The system of claim 1, wherein the processor is to transmit the encryption key to the image sensor via a unified architecture link.

3. The system of claim 1, wherein the processor is to transmit the encryption key to the image sensor via a transmission link, wherein the transmission link is to be verified as uncompromised.

4. The system of claim 1, wherein the processor is to generate a packet for the image data, the packet comprising header information and the image data encrypted with the encryption key.

5. The system of claim 4, wherein the header information comprises a virtual channel indicator indicating the virtual channel to be encrypted.

6. The system of claim 1, wherein the processor is to detect the image data from the image sensor via an aggregator, the aggregator to transmit image data to the processor from the image sensor and a second image sensor.

7. The system of claim 1, wherein the virtual channel to be encrypted is assigned to transmitting real-time processing image data or secure image data.

8. The system of claim 1, wherein the processor is to transmit a test image to the image sensor and verify the image data matches expected encrypted image data.

9. The system of claim 1, wherein the processor is to transmit an instruction to the image sensor to provide an electrical current to a low resistance resistor, the electrical current to interrupt a circuit in the image sensor.

10. The system of claim 1, wherein the processor is to generate a table comprising a plurality of encryption keys for a plurality of virtual channels to be encrypted.

11. The system of claim 1, wherein the processor is to receive unencrypted image data from the image sensor via a unified architecture transmission link and receive the image data encrypted with the encryption key from the image sensor via a secure decrypting microprocessor.

12. A system for transmitting encrypted image data comprising:
a processor to:
detect an encryption key by an image sensor;
store the encryption key in a register of the image sensor;
associate the encryption key with a virtual channel to form an encrypted virtual channel; and
transmit image data to an application processor from the image sensor via the encrypted virtual channel, the image data encrypted with the encryption key.

13. The system of claim 12, wherein the processor is to provide an electrical current to a low resistance resistor, the electrical current to interrupt a circuit in the image sensor.

14. The system of claim 13, wherein the electrical current is to prevent the image sensor from receiving an updated encryption key.

15. The system of claim 12, wherein the processor is to detect the encryption key from an infrared transmitter.

16. The system of claim 12, wherein the processor is to detect the encryption key from a grid-to-bit figure, wherein the grid-to-bit figure comprises alternating configuration black and white boxes along the inner perimeter of the grid-to-bit figure, and encryption black and white boxes inside the configuration black and white boxes, wherein each of the encryption black and white boxes corresponds to a bit from the encryption key.

17. The system of claim 12, wherein the processor is to generate a packet for the image data, the packet comprising header information and the encrypted image data, wherein the header information comprises a virtual channel indicator.

18. The system of claim 12, wherein the image sensor comprises infrared receivers embedded within photon sensors.

19. A method for transmitting encrypted image data comprising:
selecting a virtual channel to be encrypted between an application processor and an image sensor during an initialization process;
transmitting a virtual channel command corresponding to the selected virtual channel to the image sensor;
transmitting an encryption key detection command to the image sensor, the encryption key detection command to indicate a technique to be used by the image sensor to detect an encryption key;
polling a register in the image sensor to verify the image sensor has stored the encryption key corresponding to the selected virtual channel; and
detecting image data from the image sensor via the virtual channel, the image data encrypted with the encryption key.

20. The method of claim 19, comprising transmitting an instruction to the image sensor to provide an electrical current to a low resistance resistor, the electrical current to interrupt a circuit in the image sensor.

21. A non-transitory computer readable media for transmitting encrypted image data comprising a plurality of instructions that, in response to execution by a processor, cause the processor to:
select a virtual channel to be encrypted between an application processor and an image sensor during an initialization process;
transmit a virtual channel command corresponding to the selected virtual channel to the image sensor;
transmit an encryption key detection command to the image sensor, the encryption key detection command to indicate a technique to be used by the image sensor to detect an encryption key;
poll a register in the image sensor to verify the image sensor has stored the encryption key corresponding to the selected virtual channel; and
detect image data from the image sensor via the virtual channel, the image data encrypted with the encryption key.

22. The non-transitory computer readable media of claim 21, wherein the plurality of instructions cause the processor to transmit the encryption key to the image sensor via a unified architecture link.

* * * * *